(No Model.)  4 Sheets—Sheet 1.

B. MERKLEN.
LATHE FOR MAKING FLUTED WOODEN BODIES.

No. 447,965.  Patented Mar. 10, 1891.

WITNESSES:  INVENTOR:
A. Schehl.  Benjamin Merklen
  BY
  ATTORNEYS.

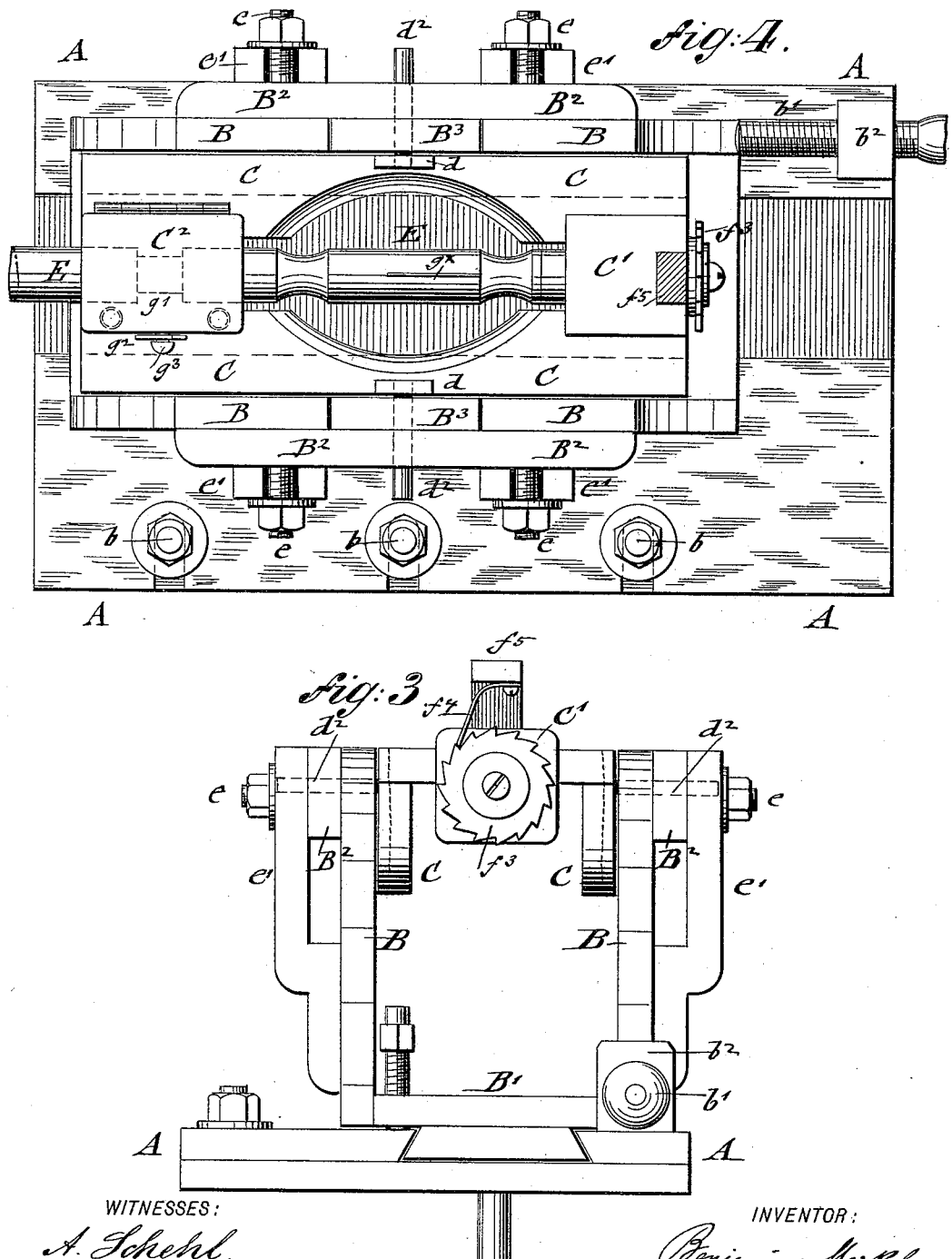

(No Model.) 4 Sheets—Sheet 3.
B. MERKLEN.
LATHE FOR MAKING FLUTED WOODEN BODIES.

No. 447,965. Patented Mar. 10, 1891.

WITNESSES:
A. Schehl.
W. Kimber

INVENTOR:
Benjamin Merklen
BY
Goepel & Raegener
ATTORNEYS.

(No Model.) 4 Sheets—Sheet 4.
B. MERKLEN.
LATHE FOR MAKING FLUTED WOODEN BODIES.
No. 447,965. Patented Mar. 10, 1891.

WITNESSES:
A. Schehl.
W. Reinker

INVENTOR:
Benjamin Merklen
BY
Goepel & Raegener
ATTORNEYS.

UNITED STATES PATENT OFFICE.

BENJAMIN MERKLEN, OF NEW YORK, N. Y., ASSIGNOR TO MERKLEN BROTHERS, OF SAME PLACE.

LATHE FOR MAKING FLUTED WOODEN BODIES.

SPECIFICATION forming part of Letters Patent No. 447,965, dated March 10, 1891.

Application filed July 5, 1890. Serial No. 357,752. (No model.)

*To all whom it may concern:*

Be it known that I, BENJAMIN MERKLEN, of the city, county, and State of New York, a citizen of the United States, have invented certain new and useful Improvements in Lathes for Making Fluted Wooden Bodies, of which the following is a specification.

This invention has reference to an improved lathe for making fluted wooden ornaments, which are to be used in ornamenting the legs of chairs, tables, bedsteads, and furniture generally; and the invention consists of a single lathe for making fluted ornamental bodies, said lathe comprising a blank-carrying spindle, which is supported at its ends by an oscillating frame and a rotary cutter-head, the shaft of which is supported at right angles to the spindle, said cutter-head imparting the longitudinal fluting to the blank. The spindle is supported in suitable boxes of the oscillating frame and adapted to be axially turned, so as to subject the blank successively to the action of the cutter-head for fluting the same. The supporting-frame of the spindle is adapted to turn on different centers by being applied to vertically-adjustable plates which are supported on fixed pivots of the standards of the main frame, so that the supporting-frame of the spindle may be adjusted higher or lower relatively to the cutter-head, according to the shape and thickness of the blank to be fluted.

The invention consists, further, of certain details of construction, which will be fully described hereinafter, and finally be pointed out in the claims.

Figure 1:
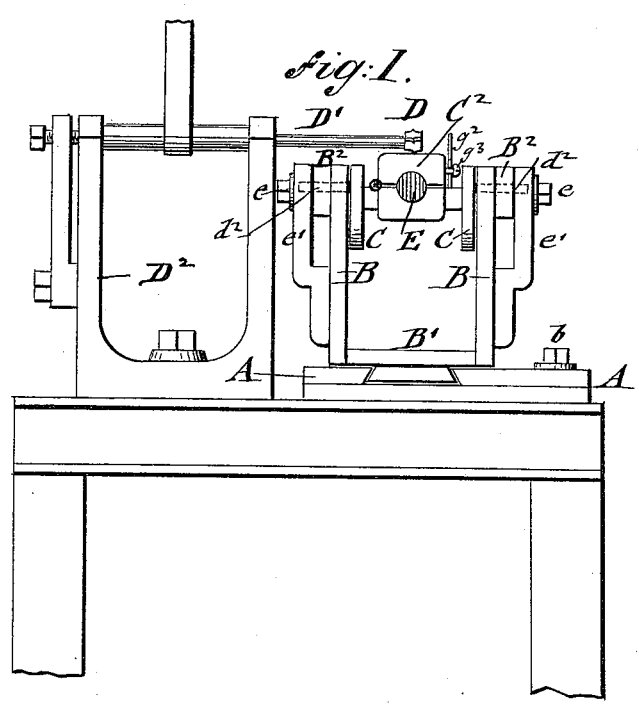
Figure 2:
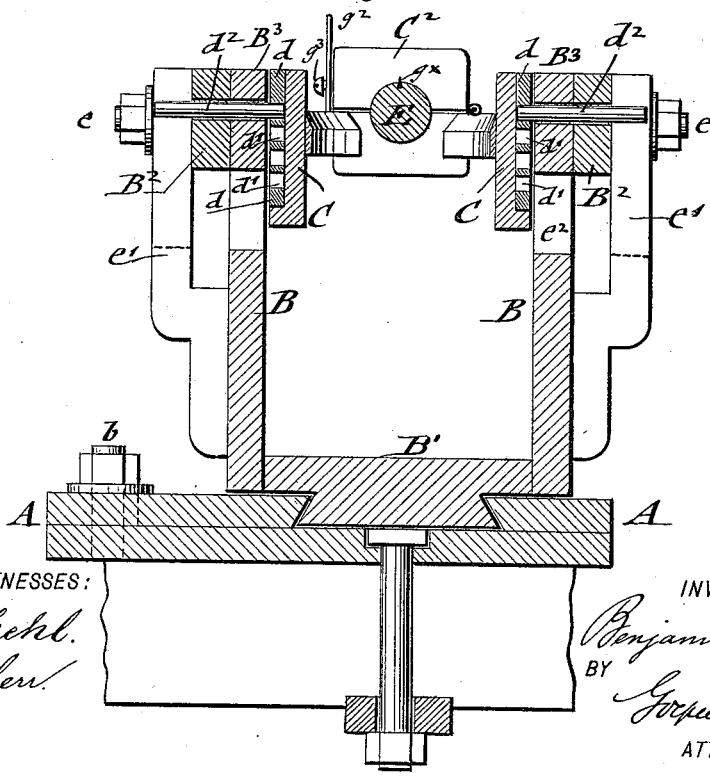
Figure 11:
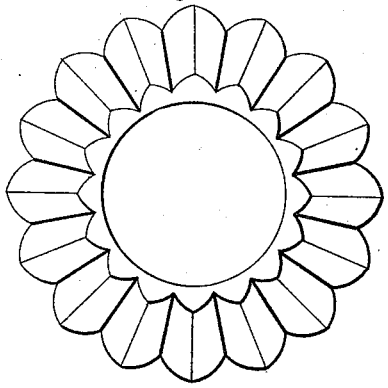

In the accompanying drawings, Figure 1 represents an end elevation of my improved lathe for making fluted wooden bodies. Fig. 2 is a vertical transverse section of the spindle-supporting rocking frame drawn on a larger scale. Fig. 3 is an end elevation showing the opposite end of the spindle-supporting rocking frame. Fig. 4 is a plan, Fig. 5 a side elevation, and Fig. 6 a vertical longitudinal section, of the same. Figs. 7, 8, 9, and 10 show different forms of blanks and the method of fluting them by supporting the rocking frame at different centers; and Fig. 11 is an end elevation of one of the fluted blanks.

Similar letters of reference indicate corresponding parts.

Figure 5:
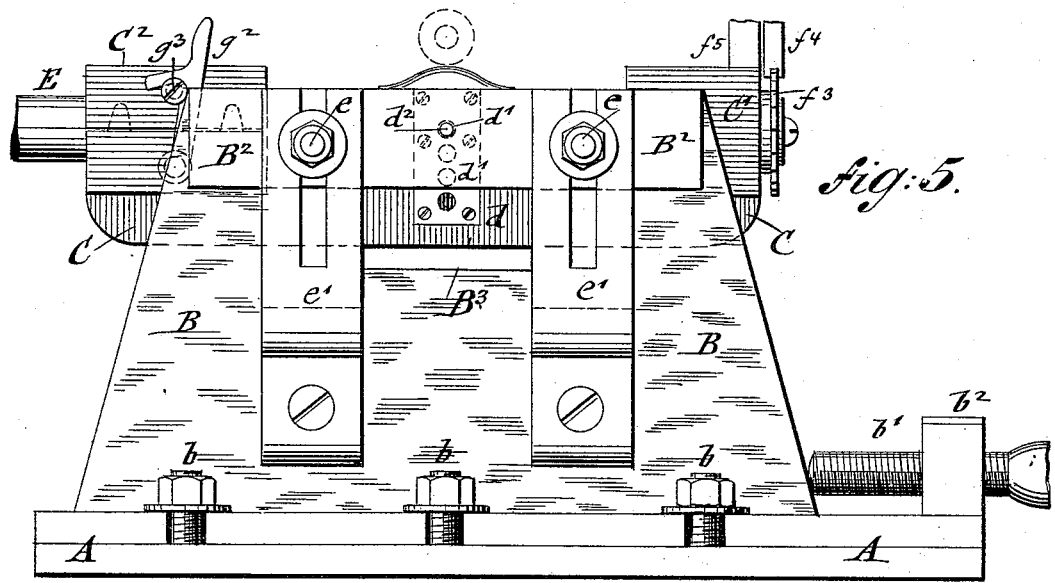
Figure 6:
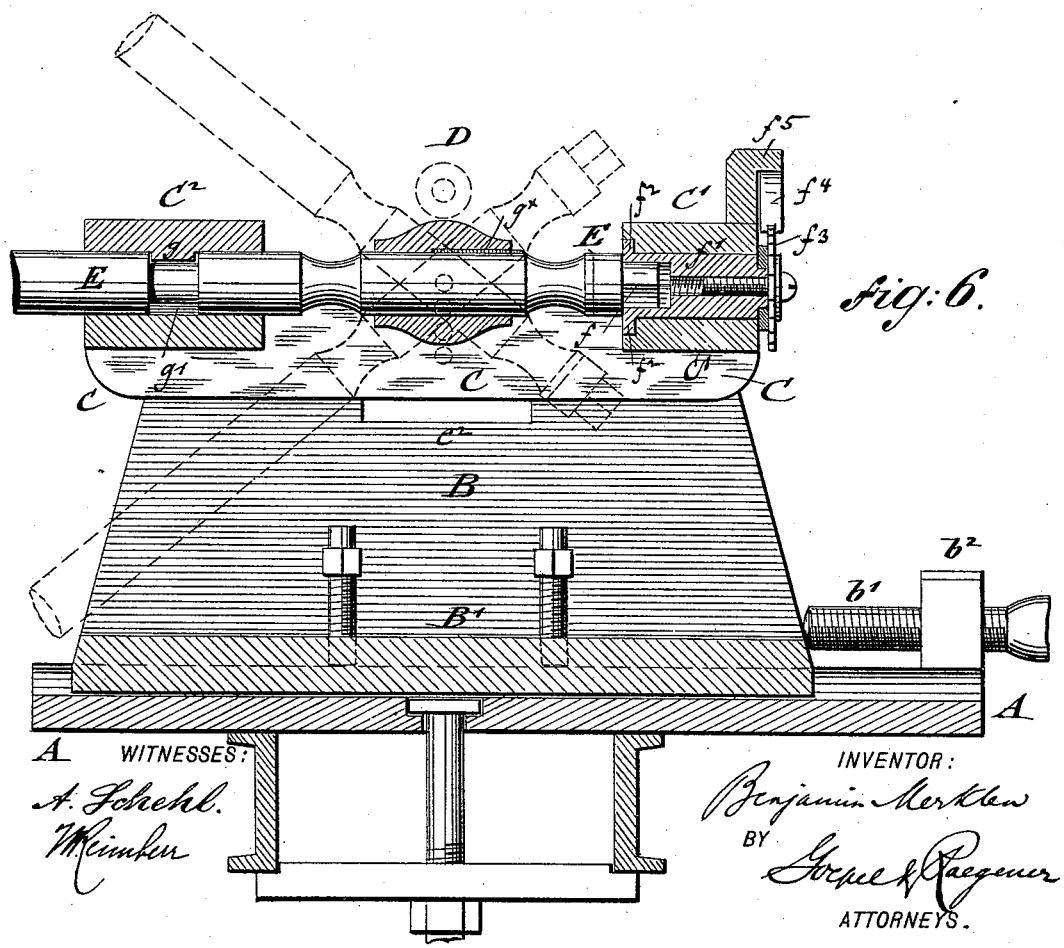
Figure 7:
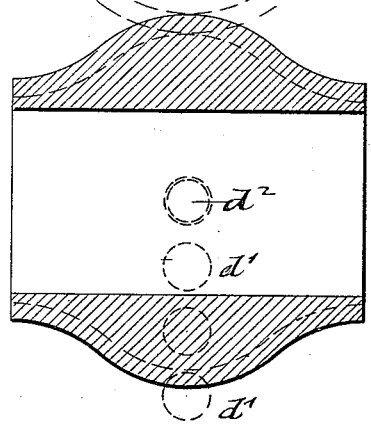
Figure 8:
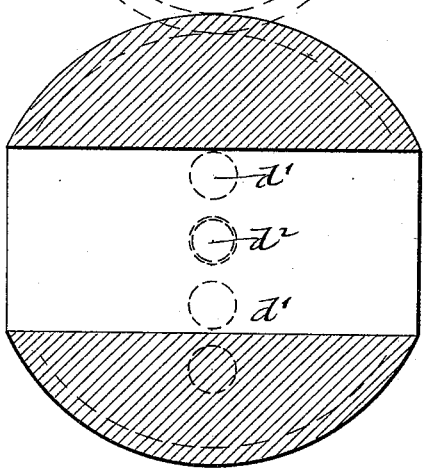
Figure 9:
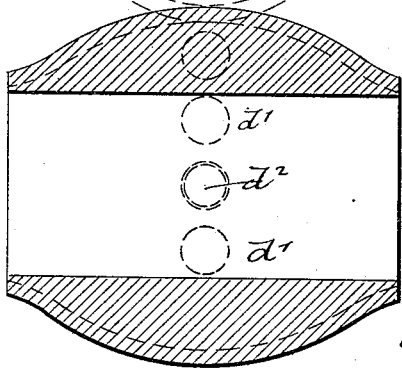
Figure 10:
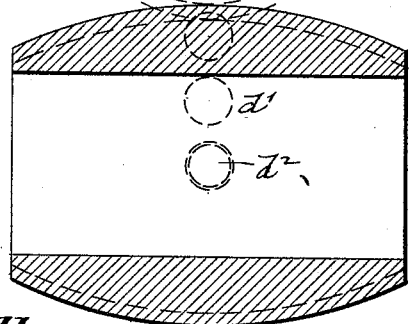

Referring to the drawings, A represents the bed-plate of my improved lathe for making fluted wooden bodies. In dovetailed ways of the bed-plate A is supported, by a base-plate B' of corresponding shape, an upright frame B, which carries a centrally-pivoted spindle-supporting rocking frame C. The upright frame may be adjusted laterally on the bed-plate A by means of set-screws $b$, that pass through recesses of the bed-plate A, and in longitudinal direction by a set-screw $b'$, that passes through a lug $b^2$ of the bed-plate A, as shown in Figs. 4, 5, and 6.

The rocking frame C supports, in boxes C' C², a removable spindle E, to which the blank to be fluted is applied by being slipped over one end thereof, which is adapted to be raised, as hereinafter described, so as to be subjected to the action of a rotary cutter-head D, the axis of which is arranged at right angles to the axis of the spindle E. The cutter-head D is applied to a shaft D', to which rotary motion is imparted by suitable belt-and-pulley transmission from a power-shaft, the shaft D' being supported in suitable bearings of upright standards D², located at one side of the upright frame B, as shown clearly in Fig. 1. The centrally-pivoted rocking frame C is provided in its sides with plates $d$, having perforations $d'$ arranged vertically, which perforations are engaged by pivot-pins $d^2$, of the upright frame B. The pivot-pins $d^2$ are inserted through holes of longitudinal plates B² and guide-blocks B³.

The plates B² are tightly secured to the upright frame B by means of clamping-screws $e$, which are passed through longitudinally-slotted bracket-arms $e'$, that are rigidly attached to the outside of the upright frame B. The guide-blocks B³ are set into central recesses $e^2$ in the side walls of the upright frame B, as shown clearly in Figs. 1, 2, and 5.

The spindle-supporting boxes C' and C² of the rocking frame C are located at the ends of said frame, the middle part of which is recessed at both sides of the spindle E, as shown in Fig. 4, so as to furnish sufficient space for the blank to be fluted. The end $f$ of the spindle E is made square and inserted in a correspondingly-recessed socket $f'$, that is guided by a flange $f^2$ in the box C′, said socket being capable of axial movement in said box by means of a ratchet-wheel $f^3$, that is secured to said socket and engaged by a spring-pawl $f^4$, that is attached to a stationary lug $f^5$ of the box C′, as shown clearly in Figs. 3 and 6. By the pawl and ratchet-wheel attachment to the socket the socket $f'$ and thereby the spindle can be turned on its axis step by step, according to the number of teeth of the ratchet, which teeth govern the number of longitudinal flutes which are to be produced on the blank. The box $C^2$ at the opposite end of the rocking frame C is provided with an interior projection $g$, which enters an annular groove $g'$ in the spindle, said box being made of a fixed lower section and an upper section hinged to the lower section, so as to permit the opening of the box for removing or inserting the spindle. The projection $g$ and groove $g'$ lock the spindle in position and prevent any longitudinal shifting of the same in the boxes of the rocking frame. Steadying-pins in the lower section of the box $C^2$ engage corresponding recesses of the upper section of the same, while a hook $g^2$, that is pivoted to the lower section, engages a pin $g^3$ of the upper section and produces the rigid locking of the upper section to the lower section of the box $C^2$.

That part of the spindle C intermediately between the boxes C′ $C^2$ is provided with a beveled longitudinal key $g^\times$, over which the tubular blank to be fluted is pushed, so as to be retained firmly in position on the spindle E intermediately between the boxes C′ and $C^2$. When the blank is thus in position, the spindle is taken hold of at the end and subjected to a rotary motion, while a slow rocking motion is imparted to the blank-carrying spindle, as shown in dotted lines in Fig. 6, whereby a longitudinal flute is cut into the outer surface of the blank by the cutter-head. After one flute is completed the spindle is turned on its axis for one tooth of the ratchet-wheel $f^3$ and then exposed again to the action of the rotary cutter-head, so that the next flute is produced on the blank, and so on until the whole circumference of the blank is fluted. The spindle E is then removed from the boxes C′ $C^2$ by opening the hinged upper section of the box $C^2$ and then withdrawing the square end of the spindle from the socket of the box C′, whereby the spindle is detached from its supporting-frame. The fluted body can be removed from the spindle and a new blank placed in position thereon, after which the spindle is replaced into position in the supporting-boxes C′ $C^2$, so as to be ready for the action of the rotary cutter-head by which the successive flutes are cut, as before described.

For the purpose of adapting the oscillating frame of the blank-carrying spindle for different sizes and shapes of blanks, as shown in Figs. 7 to 10, the rocking frame C has to be oscillated on different centers relatively to the cutter-head. For this purpose the guide-blocks $B^3$ and guide-plates $B^2$ and pivot-pins $d^2$ are adjusted higher or lower in the guide-recesses of the side walls of the frame B and bracket-arms $e'$, so that the pivots $d^2$ engage higher or lower perforations of the plates $d$ in the side walls of the rocking frame C, as shown in Fig. 2. By adjusting the pivots $d^2$ in this manner higher or lower relatively to the cutter-head wave-like or arc-shaped flutes may be produced, as shown in detail in Figs. 7 to 10, according to the size of the blanks. The spindle and blank on the same remain thereby in the same relative position to the rotary cutter-head, while the pivots on which the spindle is rocked is changed. This vertical adjustment of the pivots of the rocking frame C of the blank-carrying spindle forms the essential feature of my improved lathe, as thereby blanks of varying shapes and sizes can be quickly and cheaply fluted on the same machine.

Having thus described my invention, I claim as new and desire to secure by Letters Patent—

1. The combination, with a rotary cutter-head, of a single blank-carrying spindle, a rocking frame having boxes supporting said spindle at right angles to the axis of the cutter-head, and means for detachably securing the ends of the spindle in said boxes, substantially as set forth.

2. The combination, with a rotary cutter-head, of a blank-carrying spindle and a rocking frame having a box with an interior and axially-turning socket for one end of the spindle and a second box with a hinged upper section for permitting the removing of the spindle from the rocking frame for removing the fluted blank and applying a new blank to the spindle, substantially as set forth.

3. The combination, with a rotary cutter-head, of a blank-carrying spindle, a rocking frame having boxes at its ends for supporting said spindle and perforated plates in its side walls, and an upright supporting-frame having vertically-adjustable pivot-pins that are adapted to engage the perforations of the side plates, so as to permit the rocking of the spindle on different centers relatively to the cutter-head, substantially as set forth.

4. The combination of an upright supporting-frame having recessed side walls and bracket-arms, guide-blocks in the recessed side walls, guide-plates interposed between the side walls and bracket-arms, means for clamping said guide-plates in position, pivots passing through holes of the guide-blocks and guide-plates, and a rocking frame having perforated plates in its side walls for engagement with the vertically-adjustable pivots of the upright frame, substantially as set forth.

5. The combination, with a rocking frame, a box at one end of said frame, said box having a square recessed socket supported in said box, means for axially turning said socket on the box, a second box located at the opposite end of the rocking frame and formed of a fixed lower and a hinged upper section, the latter having an interior projection, means for locking the sections of the box, and a spindle having a square end for engaging the socket of one box, and an annular groove for engagement with the projection of the second box, substantially as set forth.

In testimony that I claim the foregoing as my invention I have signed my name in presence of two subscribing witnesses.

BENJAMIN MERKLEN.

Witnesses:
PAUL GOEPEL,
MARTIN PETRY.